US005964482A

United States Patent [19]

Bamberger et al.

[11] Patent Number: 5,964,482

[45] Date of Patent: Oct. 12, 1999

[54] CONNECTION BETWEEN A PIPE AND A MOLDING

[75] Inventors: Michael Bamberger, Gailingen, Germany; Erasmo Porfido, Schaffhausen, Switzerland; Bernd Kling, Gottmadingen, Germany

[73] Assignee: Georg Fischer Rohrleitungssysteme AG, Schaffhausen, Switzerland

[21] Appl. No.: 08/964,819

[22] Filed: Nov. 5, 1997

[30] Foreign Application Priority Data

Nov. 7, 1996 [DE] Germany .......................... 196 45 853

[51] Int. Cl.$^{6}$ ............................ B65D 57/00; F16L 21/06

[52] U.S. Cl. ............................ 285/23; 285/322; 285/317

[58] Field of Search ............................ 285/23, 308, 309, 285/310, 313, 339, 342, 305, 317, 322; 403/325

[56] References Cited

U.S. PATENT DOCUMENTS

| | | | |
|---|---|---|---|
| 2,848,256 | 8/1958 | Tyler | 285/342 X |
| 3,507,528 | 4/1970 | Desmarchais | 403/325 |
| 3,815,940 | 6/1974 | Luckenbill | 285/342 X |
| 3,973,791 | 8/1976 | Porta et al. | 285/305 |
| 5,211,427 | 5/1993 | Washizu et al. | 285/305 X |
| 5,366,259 | 11/1994 | Hohmann et al. | 285/305 |
| 5,472,242 | 12/1995 | Peterson | 285/305 X |

*Primary Examiner*—Anthony Knight
*Assistant Examiner*—Gary Grafel
*Attorney, Agent, or Firm*—Bachman & Lapointe, P.C.

[57] ABSTRACT

In a connection between a pipe and a molding, a tubular housing, fixed on the molding, engages around the pipe with an inner wall tapering conically toward the free end of the housing. Arranged between the pipe and the housing inner wall is a clamping ring, which braces the pipe with the housing in a wedge-like manner. The clamping ring is held in its wedging functional position by a spring element acting on it in the axial direction. The spring element can be locked in a prestressed state without force acting on the clamping ring. To establish the connection between the pipe and the molding, a locking clip passing through the housing is pulled out of the housing to relax the spring element.

7 Claims, 2 Drawing Sheets

32

18

10

CONNECTION BETWEEN A PIPE AND A MOLDING

BACKGROUND

The present invention relates to a connection between a pipe and a molding with the aid of a clamping ring which encloses the pipe, is arranged in a housing surrounding the pipe and tapering conically at one end and interacts with a spring which, in its operating position, braces the clamping ring between the conical part of the housing and the pipe.

Such a connection has been disclosed by the publication DE 35 25 502 and is designed as a sealing plug-in pipe joint.

The disadvantage of such known clamping connections is that the clamping force used cannot be controlled, or only with difficulty, which may result in the connection being damaged or even destroyed if excessive force is exerted and may result in leaks if inadequate force is exerted.

Furthermore, the release of such a connection is complicated and, often, is possible only by using special tools.

Accordingly, it is the principle object of the invention to provide a connection of the type mentioned at the beginning in which the clamping force exerted can be set in a defined way. It is a further object that the connection is to be easy and quick to separate.

SUMMARY OF THE INVENTION

The foregoing objects are achieved by way of a connection of the type mentioned at the beginning wherein, according to the invention, the housing has a locking member which can be moved between two positions and, in the arresting position, protruding into the spring path of the helical spring designed as a compression spring, forms a stop for the compressed compression spring and prevents the latter from acting on the clamping ring, whereas, in its second position, the arresting member relieves the compression spring and allows it to relax abruptly.

The use of a prestressed compression spring which is relaxed suddenly and abruptly for arresting the clamping ring allows a predetermined force to be specifically used. The compression spring is released very easily by the actuation of a locking clip, whereby the predetermined spring force released is not influenced in any way.

By selecting the compression spring which is suitable, the force used can be accurately determined and matched to the parts to be connected.

Since the actual connection takes place with the aid of the clamping ring between the pipe and a housing, which for its part can be separated from the molding in a simple way, any releasing of the clamping connection which may occur does not present any problem, since, according to a preferred configuration of the connection, the housing, which surrounds the pipe, the clamping ring and the molding, is fastened on the molding in a rotatable and releasable manner with the aid of a securing element. This securing element can be released by simple actions, whereupon the molding can be removed and the clamping ring exposed.

BRIEF DESCRIPTION OF THE DRAWINGS

Further features of the invention emerge from the following description of a preferred exemplary embodiment, which is subsequently explained in more detail with reference to the drawing, in which.

DETAILED DESCRIPTION

Figure 2:
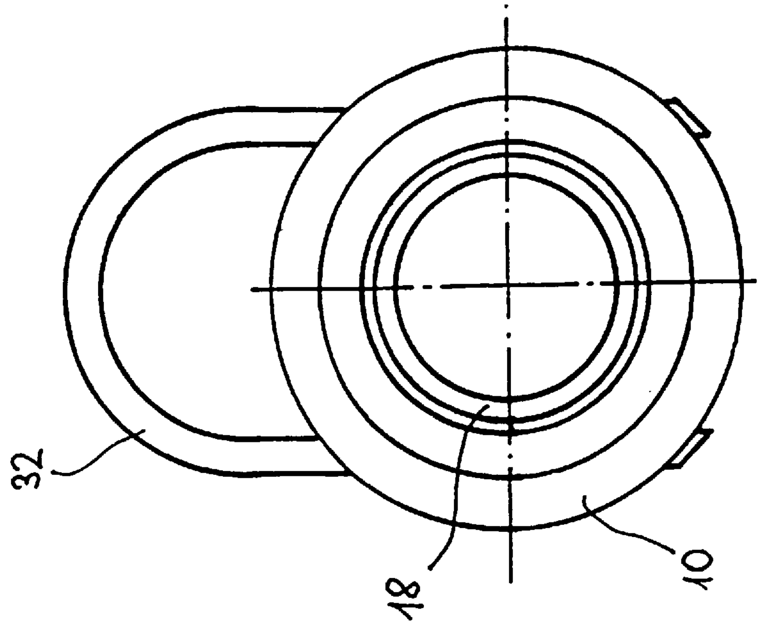
FIG. 2 shows an end view of the connection from FIG. 1.
Figure 1:
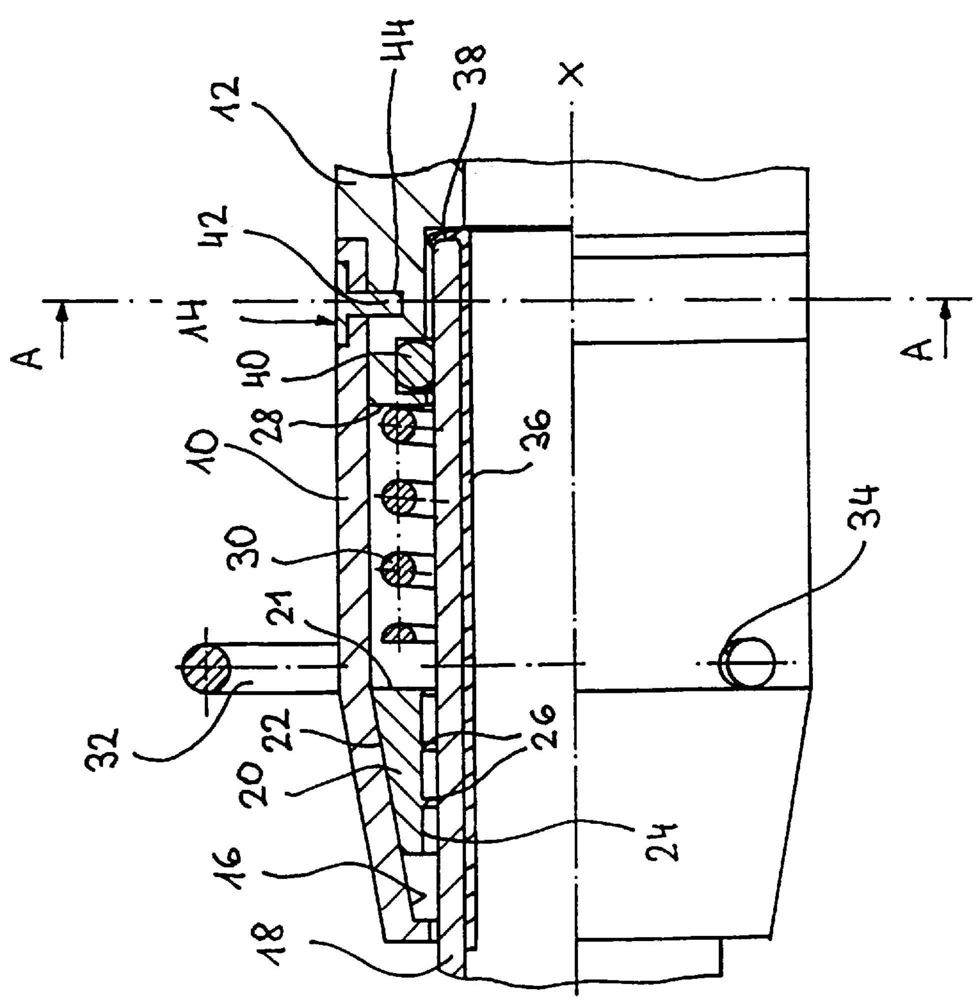
FIG. 1 shows a partial longitudinal section through a connection according to the invention.

According to FIG. 1, a tubular housing 10 engages over the end of a molding 12 and is fixed on said part by a securing element 14, described in more detail further below.

The housing 10 has at its end remote from the molding 12 an inner wall 16 tapering conically toward the free end of the housing 10. In this conically tapering region of the housing 10 there is inserted a clamping ring 20 with a conical circumferential surface 22 corresponding to the conical inner wall 16. The inner surface 24 of the clamping ring 20 is provided with profile projections 26 running radially around it. Arranged on the clamping ring 20 are axially running slits, additionally distributed over its circumference. These slits (not shown in the drawing) assist the radial compressibility of the clamping ring 20.

Arranged in the axial direction x, in that part of the housing 10 which adjoins the molding 12, is a helical compression spring 30. One end of the compression spring 30 lies against an end 28 of the molding 12 and bears with the other end under prestress against a locking clip 32, which passes through bores 34 in the housing 10.

A pipe 18 is inserted into the housing 10 until it makes contact with the molding 12, in such a way that the clamping ring 20 and the compression spring 30 enclose the pipe 18.

Arranged on the inner wall of the pipe 18 is a supporting sleeve 36. A flange 38 on the supporting sleeve 36 engaging over the end of the pipe 18 protects a sealing ring 40, inserted in the molding 12, from being damaged by sharp edges when the pipe 18 is pushed into the housing 10.

Figure 4:
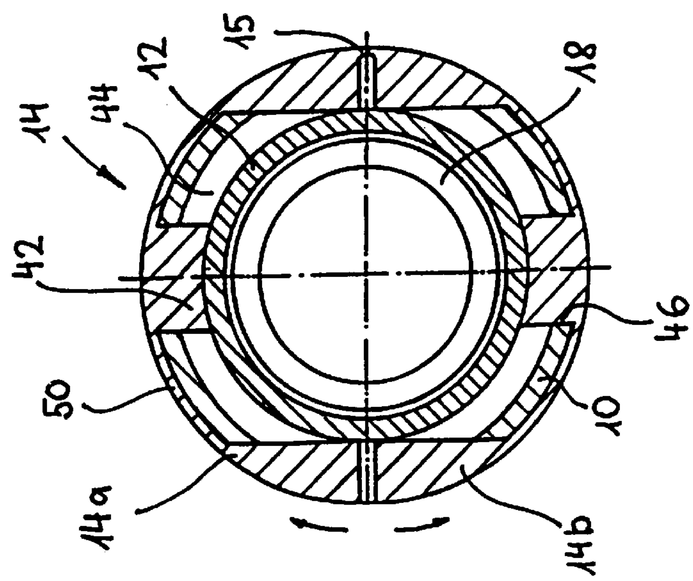
FIG. 4 shows a section through a securing element of the connection from FIG. 1 along the line 4—4 in the latter.
Figure 3:
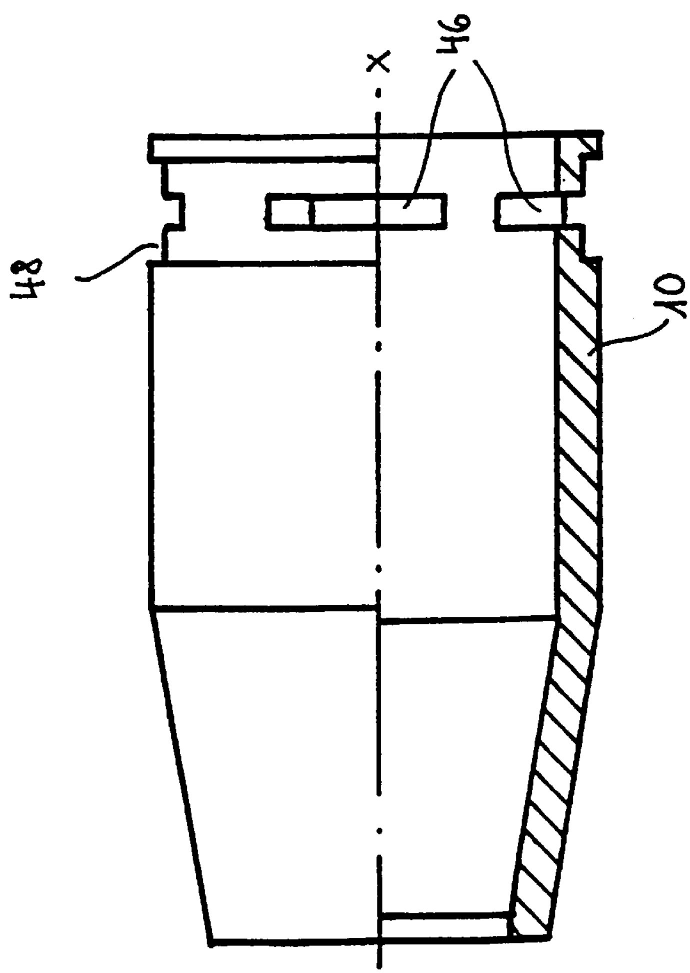
FIG. 3 shows a partial longitudinal section through the housing part of the connection from FIG. 1.

FIGS. 3 and 4 illustrate the design of the securing element 14 and its positioning in the housing 10.

The securing element 14 is constructed from two identical parts 14*a*, 14*b*, which can be expanded to a certain extent, in an annular form apart from a shared connecting point 15 of small material thickness. Catch members 42, protruding radially inward from a circumferential part 50, pass through slit-like openings 46 in the housing 10 when the securing element 14 is fitted. In the installed position, the securing element 14 is inserted in a groove 48 running radially on the housing 10 and the catch members 42 engage with a running radially groove 44 arranged in the molding 12. With the chosen arrangement, the housing 10 is fixed on the molding 12 in a rotatable manner, with the result that, before the pipe 18 is connected to the molding 12, the arresting clip 32 can be turned into a position to assist operation.

The assembly and operating principle of the connection are explained in more detail below with reference to FIG. 1.

First of all, the clamping ring 20 is introduced into the housing 10 and the arresting clip 32 is inserted into the bores 34 in the housing 10. After fitting the compression spring 30, it is stressed by pushing the housing 10 onto the molding 12. By fitting the securing element 14, the housing 10 is fixed on the molding 12, with the result that the compression spring 30 is held in its prestressed position between the end 28 of the molding 12 and the arresting clip 32.

After pushing the pipe 18 into the housing 10, the arresting clip 32 is pulled out of the housing 10. As this takes place, the compression spring 30 expands along an axis x until it comes directly up against the neighboring annular rim 21 on the end of the clamping ring 20 and presses the latter against the conically tapering inner wall 16 of the housing 10. At the same time, the clamping ring 20—assisted by the axially arranged slits—is radially compressed, i.e. its diameter is reduced, with the result that the profile projections 26, protruding from the inner surface 24 of the clamping ring 20, are pressed as interlocking elements into the surface of the pipe 18. The radial compressibility of the clamping ring 20 makes it possible without any problem to compensate for tolerance differences in the external pipe diameter.

With the defined prestressing of the compression spring 30, the spring force acting on the clamping ring 20 in its wedging functional position is also predetermined and can be set according to the requirements imposed on a connection.

The clamping force of the clamping ring 20 is retained by the residual stress of the compression spring 30. Under tensile loading on the connection, the clamping ring 20 is additionally pressed against the conical inner wall 16 of the housing 10, whereby the clamping ring 20 is additionally radially compressed and, as a result, pressed even more strongly against the pipe 18.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. A connection for joining a pipe to a tubular housing comprising:

a tubular housing having an internal wall surface and an outer peripheral surface, said internal wall surface having at least one conical surface provided with a conical taper which tapers toward an end of said housing;

a clamping ring located in said tubular housing, said clamping ring having an outer surface having a conical taper which mates with said conical taper on said internal wall of said tubular housing and an inner surface defining an opening for receiving said pipe in said opening;

abutment means associated with said internal wall surface of said housing and spaced from said clamping ring for forming a space therebetween;

spring means located in said space; and movable locking means associated with said space for holding said spring means in compression between said locking means and said abutment means when said movable locking means is in a first position in said space and allowing said spring means to expand a long an axis and act on said clamping ring when said movable locking means is in a second position whereby said clamping ring secures said pipe in said housing.

2. The connection as claimed in claim 1, wherein said abutment means comprises a stop arranged on the molded part.

3. The connection as claimed in claim 1, wherein said locking means comprises a locking clip guided in bores in said tubular housing for movement back and forth at right angles to said axis.

4. The connection as claimed in claim 1, further including a molded part wherein said tubular housing, which surrounds the pipe and the clamping ring, is fastened at another end remote from the conical taper end to said molded part in a rotatable and releasable manner by securing means.

5. The connection as claimed in claim 4, wherein said securing means comprises a split circumferential part having inwardly protruding catch members which pass through slit-like openings provided in said tubular housing and engage in a groove running radially on said housing.

6. The connection as claimed in claim 1, wherein the clamping ring is provided on said inner surface with projections for locking on said pipe.

7. The connection as claimed in claim 1, wherein the clamping ring is provided with axial slits distributed around the circumference thereof which are compressed when said spring is relaxed.

* * * * *